United States Patent
Huo

(10) Patent No.: US 10,742,778 B2
(45) Date of Patent: Aug. 11, 2020

(54) DEVICE AND METHOD FOR CONTROLLING MULTI-PROTOCOL IOT OPERATIONS

(71) Applicant: GD Midea Air-Conditioning Equipment Co., Ltd., Foshan (CN)

(72) Inventor: Weiming Huo, Foshan (CN)

(*) Notice: Subject to any disclaimer, the term of this patent is extended or adjusted under 35 U.S.C. 154(b) by 0 days.

(21) Appl. No.: 16/177,455

(22) Filed: Nov. 1, 2018

(65) Prior Publication Data

US 2019/0075190 A1     Mar. 7, 2019

Related U.S. Application Data

(63) Continuation of application No. PCT/CN2017/094484, filed on Jul. 26, 2017.

(30) Foreign Application Priority Data

May 12, 2017    (CN) .......................... 2017 1 0345593

(51) Int. Cl.
    *H04W 4/00*      (2018.01)
    *H04L 29/06*      (2006.01)
    (Continued)

(52) U.S. Cl.
    CPC ............ *H04L 69/18* (2013.01); *H04L 12/282* (2013.01); *H04L 12/2834* (2013.01);
    (Continued)

(58) Field of Classification Search
    CPC ... H04L 69/18; H04L 12/282; H04L 12/2834; H04W 4/33; H04W 4/70; H04W 72/14
    See application file for complete search history.

(56) References Cited

U.S. PATENT DOCUMENTS

2011/0317584 A1    12/2011   Wu
2015/0358777 A1*   12/2015   Gupta ................. H04L 12/2807
                                                           370/254

(Continued)

FOREIGN PATENT DOCUMENTS

CN        102917425 A     2/2013
CN        102917426 A     2/2013
(Continued)

OTHER PUBLICATIONS

The first Office Action dated Nov. 15, 2019 in the corresponding CN application No. 201710345593.9.

*Primary Examiner* — Abdelnabi O Musa
(74) *Attorney, Agent, or Firm* — Kilpatrick Townsend & Stockton, LLP

(57) ABSTRACT

Disclosed are a device and a method for controlling multi-protocol operation, and the device includes: an acquiring module, being configured to acquire the priority of each target network protocol when detecting that a plurality of network protocols in the Wi-Fi module and the corresponding Internet of things (IOT) operator server are matching successfully; an allocating module, being configured to allocate a time slice of the Wi-Fi module processor for the corresponding target network protocol according to the priority; an adjusting module, being configured to count the usage of each of the target network protocols, and dynamically adjust the priority of each target network protocol for adjusting the number of time slices that allocated to the corresponding target network protocol.

20 Claims, 3 Drawing Sheets

(51) Int. Cl.
*H04L 12/28* (2006.01)
*H04W 4/33* (2018.01)
*H04W 4/70* (2018.01)
*H04W 74/08* (2009.01)
*H04W 72/14* (2009.01)
*H04W 72/12* (2009.01)

(52) U.S. Cl.
CPC .............. *H04L 69/24* (2013.01); *H04W 4/33* (2018.02); *H04W 4/70* (2018.02); *H04W 72/14* (2013.01); *H04W 74/0875* (2013.01); *H04L 2012/2841* (2013.01); *H04W 72/1242* (2013.01)

(56) References Cited

U.S. PATENT DOCUMENTS

| | | | |
|---|---|---|---|
| 2016/0164803 A1* | 6/2016 | Wu | H04L 12/2801 370/254 |
| 2016/0274870 A1* | 9/2016 | Seidman | G06F 8/35 |
| 2017/0134182 A1* | 5/2017 | Davis | H04W 4/70 |
| 2018/0116004 A1* | 4/2018 | Britt | H04W 40/125 |

FOREIGN PATENT DOCUMENTS

| | | |
|---|---|---|
| CN | 103181103 A | 6/2013 |
| CN | 105653434 A | 6/2016 |
| CN | 105959189 A | 9/2016 |
| CN | 106302078 A | 1/2017 |
| CN | 106341452 A | 1/2017 |

\* cited by examiner

DEVICE AND METHOD FOR CONTROLLING MULTI-PROTOCOL IOT OPERATIONS

CROSS-REFERENCE TO RELATED APPLICATIONS

This application is a continuation of International Application PCT/CN2017/094484, filed on Jul. 26, 2017, which claims the priority of the Chinese Patent Application No. 201710345593.9 entitled "DEVICE AND METHOD FOR CONTROLLING MULTI-PROTOCOL OPERATION", filed in the Chinese Patent Office on May 12, 2017, the entire contents of which are herein incorporated by reference.

TECHNICAL FIELD

The present disclosure relates to the field of smart home technology, and more particularly relates to a method and a device for controlling multi-protocol operation.

BACKGROUND

With the improvement of technology, household electrical appliances (such as air conditioners, purifiers, kitchen appliances, etc.) have been widely used, and the control of household electrical appliances is no longer limited to the supporting infrared remote control. Application scenario of intelligently and remotely controlling the household electrical appliances based on WI-FI module has gradually emerged. User only need to install the APP application corresponding to the household appliance in his mobile terminal (such as a smart phone or a tablet computer), and then activate the APP application to control the household appliance in the mobile terminal.

In the application scenario of intelligently controlling mentioned above, the WI-FI module serves as a bridge between the Internet of Things (IOT) household appliance and the cloud, and various IOT operators (such as JD, Ali, SUNING, etc.) have their own network protocols, thus bringing out a user's needs, that the user's mobile terminal requires two or more network protocols to control the same appliance through the same WI-FI module.

During the control of the household appliances by the mobile terminal, user will eventually select one or two Internet-connected operators' APPs to control the household appliance, that is to say, the user will eventually only use one or two network protocols of the WI-FI module. However, the processor of the Wi-Fi module still processes all corresponding network protocols in parallel. Since the processor chip of the WI-FI module is at a lower frequency (based on cost limitation), the WI-FI module processor has less processing ability in a standard unit time, which leads to that how much time slice is allocated to each network protocol is directly related to its performance. When the network protocol which is not used by user also takes a lot of time slices, result in that the network protocols commonly used are allocated less time slices than single-protocols, may cause the technical problem that the WI-FI module responds slowly to user's operations.

SUMMARY

It is therefore one main object of the present disclosure to provide a device and a method for controlling multi-protocol operation, aiming to solve the technical problem that the WI-FI module responses slowly to user operations when running multiple protocols.

To achieve the above object, this disclosure provides a device for controlling multi-protocol operation, the device is applied to a mobile terminal, the mobile terminal includes a Wi-Fi module, and the Wi-Fi module includes multiple network protocols for IOT operators that control household appliances, the device includes: an acquiring module, being configured to acquire the priority of each target network protocol when detecting that a plurality of network protocols in the Wi-Fi module and the corresponding IOT operator server are matching successfully, wherein the network protocol that successfully matching is taken as the target network protocol. And allocating module, being configured to allocate a time slice of the Wi-Fi module processor for the corresponding target network protocol according to the priority, wherein the more time slices are allocated for the higher priority. And adjusting module, being configured to count the usage of each target network protocols, and dynamically adjust the priority of each target network protocol to adjust the number of time slices that allocated to the corresponding target network protocol, wherein the higher the priority of the target network protocol, the more time slices are allocated.

In some embodiments, the device further comprising a matching module, the matching module is configured to perform the following operations. When the matching request is detected, determining a network protocol to be matched and other network protocols except the network protocol to be matched from all the network protocols of the Wi-Fi module. Releasing a preset ratio of time slices assigned to other network protocols, allocating the released time slices and the remaining time slices of the Wi-Fi module processor to the network protocol to be matched, for the network protocol to match with the corresponding IOT operator server.

In some embodiments, the matching module is further configured to perform the following operations. After the network protocol to be matched is successfully matched, the released time slices is reallocated to the other network protocols for normal operation.

In some embodiments, the adjusting module comprising the following parts. Counting unit, being configured to calculate a usage time proportion of each target network protocols within a preset duration. And adjusting unit, being configured to adjust the priority of all the target network protocols once every preset interval according to the usage time proportion, wherein the higher the usage time of the target network protocol is, higher the corresponding priority is; and reallocating time slices for each target network protocol based on the adjusted priority.

In some embodiments, the priority comprises a first level priority, a second level priority, and a third level priority. The adjusting unit is configured to allocate a corresponding proportion time slices for each target network protocol based on the adjusted priority; if the target network protocol is the first level priority, then allocate the first proportion time slices of the Wi-Fi module processor to the target network protocol; if the target network protocol is the second level priority, then allocate the second proportion time slices of the Wi-Fi module processor to the target network protocol; if the target network protocol is the third level priority, then allocate the third proportion time slices of the Wi-Fi module processor to the target network protocol; wherein the first proportion is greater than the second proportion, and the second proportion is greater than the third proportion.

In addition, the present disclosure further provides a method for controlling multi-protocol operation, the method is applied to a mobile terminal, the mobile terminal includes a Wi-Fi module, and the Wi-Fi module includes multiple network protocols for IOT operators that control household appliances, the method comprising the following options. Acquiring the priority of each target network protocol when detecting that a plurality of network protocols in the Wi-Fi module and the corresponding IOT operator server are matching successfully, wherein the network protocol that successfully matching is taken as the target network protocol. Allocating a time slice of the Wi-Fi module processor for the corresponding target network protocol according to the priority, wherein the more time slices are allocated for the higher priority. Counting the usage of each target network protocols, and dynamically adjust the priority of each target network protocol to adjust the number of time slices that allocated to the corresponding target network protocol, wherein the higher the priority of the target network protocol, the more time slices are allocated.

In some embodiments, the method further comprising the following options. When the matching request is detected, determining a network protocol to be matched and other network protocols except the network protocol to be matched from all the network protocols of the Wi-Fi module. Releasing a preset ratio of time slices assigned to other network protocols, allocating the released time slices and the remaining time slices of the Wi-Fi module processor to the network protocol to be matched, for the network protocol to match with the corresponding IOT operator server.

In some embodiments, subsequent to the block of releasing a preset ratio of time slices assigned to other network protocols, allocating the released time slices and the remaining time slices of the Wi-Fi module processor to the network protocol to be matched, the method further comprising the following option. After the network protocol to be matched is successfully matched, the released time slices is reallocated to the other network protocols for normal operation.

In some embodiments, the block of counting the usage of each target network protocols, and dynamically adjust the priority of each target network protocol to adjust the number of time slices that allocated to the corresponding target network protocol comprises the following options. Calculating a usage time proportion of each target network protocols within a preset duration. Adjusting the priority of all the target network protocols once every preset interval according to the usage time proportion, wherein the higher the usage time of the target network protocol is, the higher the corresponding priority is; and reallocating time slices for each target network protocol based on the adjusted priority.

In some embodiments, the priority comprises a first level priority, a second level priority, and a third level priority; the block of reallocating time slices for each target network protocol based on the adjusted priority comprises the following option. Allocating a corresponding proportion time slices for each target network protocol based on the adjusted priority; if the target network protocol is the first level priority, then allocate the first proportion time slices of the Wi-Fi module processor to the target network protocol; if the target network protocol is the second level priority, then allocate the second proportion time slices of the Wi-Fi module processor to the target network protocol; if the target network protocol is the third level priority, then allocate the third proportion time slices of the Wi-Fi module processor to the target network protocol; wherein the first proportion is greater than the second proportion, and the second proportion is greater than the third proportion.

According to this embodiment of multi-protocol operation controlling device and method, acquiring the priority of each target network protocol when detecting that a plurality of network protocols in the Wi-Fi module and the corresponding IOT operator server are matching successfully. And allocating a time slice of the Wi-Fi module processor for the corresponding target network protocol according to the priority. And counting the usage of each target network protocols, and dynamically adjust the priority of each target network protocol to adjust the number of time slices that allocated to the corresponding target network protocol. Therefore, the network protocols frequently used by user is dynamically given a higher priority, and processor time slices are allocated to the target network protocol actually used by the user. So that the mobile terminal Wi-Fi module can improve the response speed to the target network protocol used by user, which can avoid wasting too much time on the target network protocol that infrequently used. Thereby improving the response speed of the mobile terminal to the network protocol and improving the user experience without increasing the cost of the Wi-Fi module.

Various implementations, functional features, and advantages of this disclosure will now be described in further detail in connection with some illustrative embodiments and the accompanying drawings.

DESCRIPTION OF EMBODIMENTS

It will be appreciated that the specific embodiments described herein are merely illustrative of the disclosure and are not intended to limit the disclosure.

Figure 1:
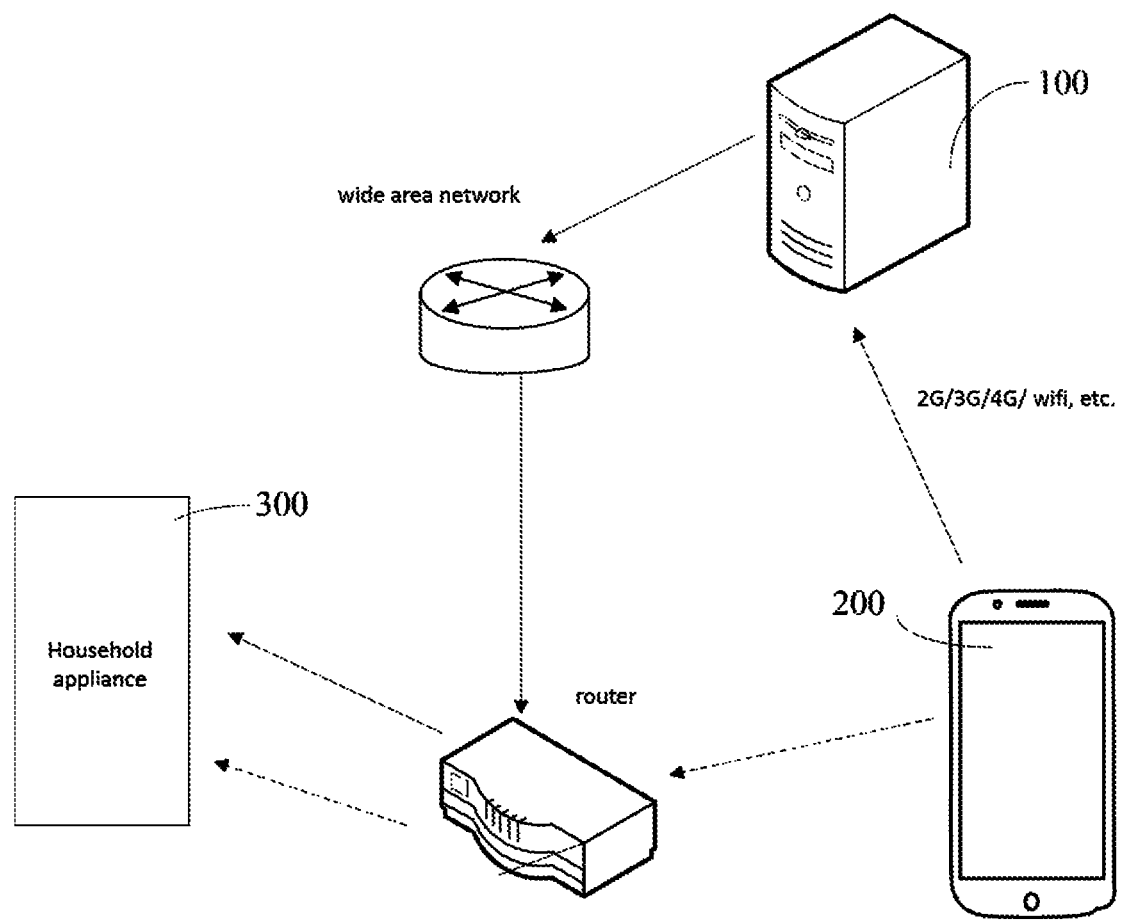
FIG. 1 is a schematic diagram of network layout in terms of a mobile terminal controlling a household appliance involved in the embodiment of a device and a method for controlling multi-protocol operation in accordance with this disclosure.

In order to better understand this disclosure, a device and a method for controlling multi-protocol operation is provided herein. As illustrated in FIG. 1, the disclosure of a device and a method for controlling multi-protocol operation can be applied to the mobile terminal 200. The mobile terminal 200 could be a smart remote controller, a smart phone, a tablet computer, etc. The mobile terminal 200 comprises a Wi-Fi module, and the Wi-Fi module includes a plurality of network protocols of the IOT (Internet of Things) operators that control the household appliances 300, each IOT operator has a corresponding server 100, and the mobile terminal 200 needs to access the server 100 corresponding to different IOT operators based on different network protocols. The mobile terminal 200 can implement the WI-FI module to control the household appliance based on the household appliance control APP, and various types of control buttons can be included on the control interface of the household appliance control APP. In addition, the mobile terminal 200 may also control the household appliance without using the server 100, the wide area network, and the router. The mobile terminal 200 may also directly control the household appliance 300 through the router.

The household appliance of the present disclosure may include an air treatment device, a kitchen appliance, a smart TV, etc. For example, the air treatment device includes an air inlet, an air outlet, a duct connecting the air inlet and the air outlet, and a function module disposed in the air duct. If the function module is a heat exchange component (the heat exchange component includes an evaporator, a refrigerant circuit, a capillary tube, etc.), and the air treatment device is an air conditioner, and the operation information includes the setting wind speed, the set temperature, the operation mode, and the like. If the function module is an air purification component (Air purification components include filters, dust removal layers, etc.), the air treatment equipment is an air purifier, and the operation information includes the setting wind speed, PM2.5, formaldehyde content, dust concentration, etc. If the functional module is a dehumidification/humidification component, the air treatment equipment is a dehumidifier/humidifier, and the operation information includes the setting wind speed, the setting humidity, etc.

Figure 2:
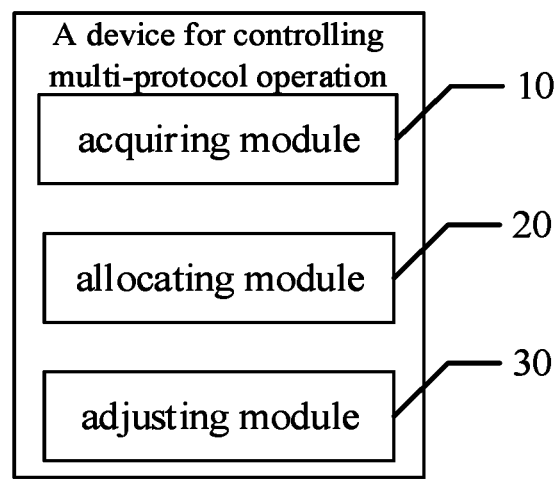
FIG. 2 is an illustrative block diagram of an embodiment of a device for controlling multi-protocol operation in accordance with this disclosure.

Based on the above content, this disclosure provides a device for controlling multi-protocol operation. The device is applied to a mobile terminal, the mobile terminal includes a Wi-Fi module, and the Wi-Fi module includes multiple network protocols for IOT operators that control household appliances. As illustrated in FIG. 2, the device comprises the following modules.

An acquiring module 10, being configured to acquire the priority of each target network protocol when detecting that a plurality of network protocols in the Wi-Fi module and the corresponding IOT operator server are matching successfully, wherein the network protocol that successfully matching is taken as the target network protocol.

A Wi-Fi module of a mobile terminal is generally installed with multiple network protocols, so that users can connect different IOT operators to control home appliances based on different network protocols. For example, the Wi-Fi module of the mobile terminal is equipped with four network protocols from IOT operators, like JD, Ali, Suning, and Midea. Among them, the current network protocols of JD, Ali, and Suning are successfully matched with the corresponding IOT servers. And obtain the priority of the three network protocols of JD, Ali and Suning. The priority of the network protocol is obtained by analyzing the usage of the network protocol by the mobile terminal user according to the multi-protocol operation control device, wherein the usage of the network protocol includes: the using frequency of the network protocol, the proportion of using time, and the number of using times. In addition, when the device for controlling multi-protocol operation sets the network protocol priority value for the mobile terminal at first time, cause the initial stage, the priority of each target network protocol can be set according to the preset backup scheme. Such as the priority of each target network protocol is equal in the initial stage.

An allocating module 20, being configured to allocate a time slice of the Wi-Fi module processor for the corresponding target network protocol according to the priority, wherein the more time slices are allocated for the higher priority.

The higher the main frequency of the Wi-Fi module processor of the mobile terminal, the more time slices the processor has. The thread in the mobile terminal ensures that the successful matching target network protocol running normally. The more time slices a thread is allocated, the faster the thread will respond. So that the mobile terminal responds faster to the network protocol corresponding to the thread that allocates more time slices. The allocating module 20 allocates a corresponding number of time slices according to the priority of each target network protocol, wherein the higher the priority, the more the number of allocated time slices. For example, the target network protocols include JD, Ali, and Suning. The priority of JD is first level and is the highest priority. The number of time slices allocated to first level is 10 n (n is a default value), and the priority of Ali is second level. The number of time slices allocated to second level is 5 n (n is the default value). Suning's priority is third, and the number of time slices allocated to third level is 2 n (n is the default value).

An adjusting module 30, being configured to count the usage of each target network protocols, and dynamically adjust the priority of each target network protocol to adjust the number of time slices that allocated to the corresponding target network protocol, wherein the higher the priority of the target network protocol, the more time slices are allocated.

After the time slice is allocated for each target network protocol according to the priority of the current target network protocol, the usage of each target network protocol by the user is restart statistics, and then confirm the priority of each target network protocol with the latest usage of each target network protocol. So that the number of time slices is dynamically allocated for each target network protocol according to the latest priority, wherein the higher the priority of the target network protocol, the more time slices are allocated. For example, the target network protocol of JD has the highest priority previously. But the user changes the usage habits and starts to use Ali to control the household appliances currently, so that the priority of the corresponding target network protocol of Ali is greatly improved. Therefore, the time slice of the Wi-Fi module processor for processing the Ali corresponding target network protocol and the processing and response speed of the Ali network protocol are both greatly increased.

In this embodiment, acquiring the priority of each target network protocol when detecting that a plurality of network protocols in the Wi-Fi module and the corresponding IOT operator server are matching successfully. And allocating a time slice of the Wi-Fi module processor for the corresponding target network protocol according to the priority. And counting the usage of each target network protocols, and dynamically adjust the priority of each target network protocol to adjust the number of time slices that allocated to the corresponding target network protocol. Therefore, the network protocols frequently used by user is dynamically given a higher priority, and processor time slices are allocated to the target network protocol actually used by the user. So that the mobile terminal Wi-Fi module can improve the response speed to the target network protocol used by user, which can avoid wasting too much time on the target network protocol that infrequently used. Thereby improving the response speed of the mobile terminal to the network protocol and improving the user experience without increasing the cost of the Wi-Fi module.

Figure 3:
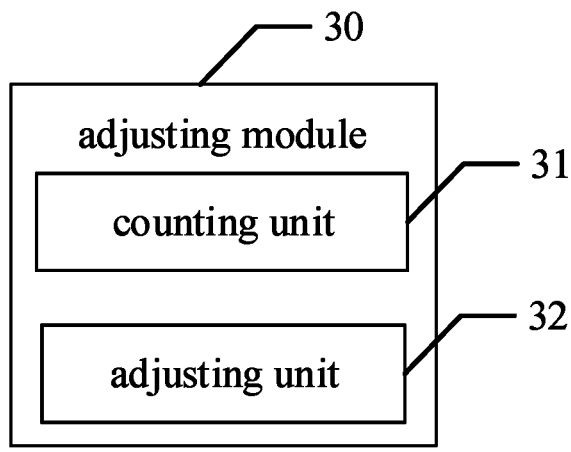
FIG. 3 is a refine block diagram of an adjustment module of a device for controlling multi-protocol operation in accordance with this disclosure.

Further, referring to FIG. 3, the adjustment module 30 includes:

A counting unit 31, being configured to calculate a usage time proportion of each target network protocols within a preset duration.

An adjusting unit 32, being configured to adjust the priority of all the target network protocols once every preset interval according to the usage time proportion, wherein the higher the usage time of the target network protocol is, the higher the corresponding priority is; and reallocating time slices for each target network protocol based on the adjusted priority.

The usage of each target network protocol can be expressed by the usage time proportion. The usage time proportion refers to the ratio of the duration of user's continuous use of a target network protocol to a preset duration. The user controls the home appliance N times based on the target network protocol within T minutes, then T minutes is the duration of user's continuous use of a target network protocol. For example, the target network protocols are JD, Ali, and Suning. It can be defined that if the home appliance is controlled twice based on a target network protocol within 10 minutes, then the target network protocol usage time is increased by 10 minutes. And the preset duration is 24 hours a day. Therefore, it can be counted that JD's target network protocol usage time is 60 minutes, Ali's target network protocol usage time is 10 minutes, and Suning's target network protocol usage time is 0 minutes, so that the user mainly uses JD, accidentally or by mistake using Ali, do not use Suning. Therefore, JD's usage time proportion is the highest, Ali is second, Suning finally, thus increasing JD's priority, correspondingly lowering the priority of Ali and Suning, and reallocating time slices for each target network protocol according to the adjusted priority.

Optionally, the priority includes a first level priority, a second level priority, and a third level priority.

The adjustment unit 22 is used to:

Allocating a corresponding proportion time slices for each target network protocol based on the adjusted priority; if the target network protocol is the first level priority, then allocate the first proportion time slices of the Wi-Fi module processor to the target network protocol; if the target network protocol is the second level priority, then allocate the second proportion time slices of the Wi-Fi module processor to the target network protocol; if the target network protocol is the third level priority, then allocate the third proportion time slices of the Wi-Fi module processor to the target network protocol; wherein the first proportion is greater than the second proportion, and the second proportion is greater than the third proportion.

The first level priority is the highest priority of the target network protocol, allowing one target network protocol to be set as the first level priority. The second level priority is the second priority of the target network protocol, allowing two target network protocols to be set as the second level priority Level. The third level priority is the third priority of the target network protocol, allowing other target network protocols to be set as the third level priority. For example, the first-level priority target network protocol has a time slice occupancy rate of 80% for the Wi-Fi module processor, and the second-priority target network protocol has a time slice occupancy rate of 20% for the Wi-Fi module processor. The third-level priority target network protocol has a time slice occupancy of zero for the Wi-Fi module processor. The priority of the target network protocol can be switched between the first, second, and third priorities. For example, obtaining the priority of the target network protocol according to the historical usage time proportion of each target network protocol. For example, JD is first-level priority, Midea and Ali are the second-level priority, and Suning is the third-level priority. If the preset duration is 24 hours per day, the basic daily protocol for controlling electrical household appliances is JD. When detecting that the user continuously operate the target network protocol corresponding to Midea for preset times (for example, 5 times) in a preset duration (for example, 60 minutes). Then adjusting the Midea corresponding target network protocol to the first-level priority temporarily, and adjusting JD to second level priority. Therefore, the priority of each target network protocol is dynamically adjusted, and then the time slice allocated to each target network protocol is adjusted, thereby allocating most of the time slices of the Wi-Fi module processor to the target network protocol frequently used by the user, thereby greatly improving the user. Responsiveness of frequently used target network protocols improves user experience.

Figure 4:
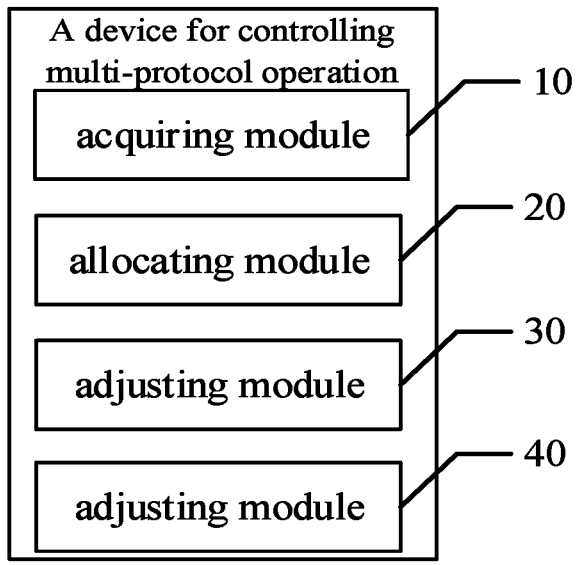
FIG. 4 is an illustrative block diagram of another embodiment of a device for controlling multi-protocol operation in accordance with this disclosure.

Further, in another embodiment of a device for controlling multi-protocol operation in accordance with this disclosure. As illustrated in FIG. 4, the device further comprises a matching module 40, and the matching module 40 is configured to perform the following operations.

When the matching request is detected, determining a network protocol to be matched and other network protocols except the network protocol to be matched from all the network protocols of the Wi-Fi module; and Releasing a preset ratio of time slices assigned to other network protocols, allocating the released time slices and the remaining time slices of the Wi-Fi module processor to the network protocol to be matched, for the network protocol to match with the corresponding IOT operator server.

When network of a mobile terminal is starting or just started, the network protocols of the Wi-Fi module in the mobile terminal start to match. The network protocol to be allocated initiates a matching request. When detecting the matching request, determining a network protocol to be matched and other network protocols except the network protocol to be matched from all the network protocols of the Wi-Fi module. The other network protocols refer to network protocols that do not need to be matched at present, such as network protocols that have been successfully matched, or network protocols do not need to used, etc. Then, releasing a preset ratio of time slices assigned to other network protocols. Preferably, all time slices occupied by other network protocols are released here, that is, the corresponding threads of other network protocols are suspended, stopping operation of other network protocols. Allocating the released time slices and the remaining time slices of the Wi-Fi module processor to the network protocol to be matched. Therefore, all or most of the time slices of the Wi-Fi module processor are used to match network for the network protocol to be matched, which greatly improves the network matching efficiency of the network protocol to be matched, and avoids the user waiting too long time or the failure of network matching caused by allocating the time slices to too many network protocols.

Optionally, the matching module is further configured to perform the following operations: after the network protocol to be matched is successfully matched, reallocating the released time slices to the other network protocols for normal operation.

After the network protocol to be matched is successfully matched, returning the time slices released by other network protocols back in time. In other words, reallocating the released time slices to the other network protocols, for other network protocols to function properly. Therefore, while ensuring efficient and fast network matching of the network protocols to matched, the impact on the normal operation of other network protocols is also reduced as much as possible.

Figure 5:
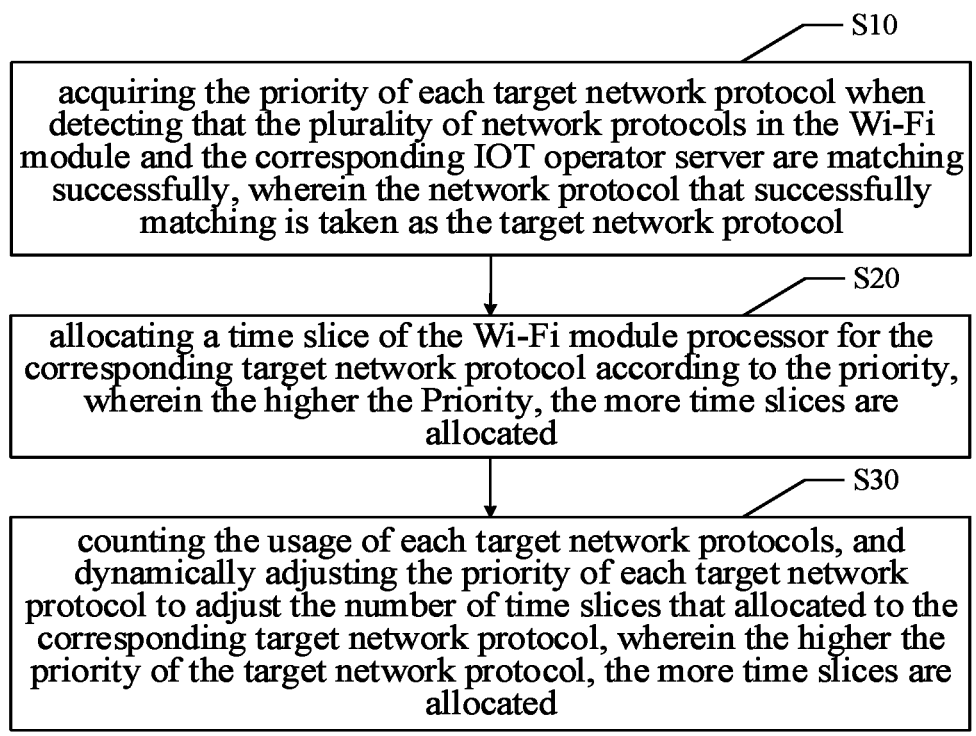
FIG. 5 is a schematic flowchart diagram of an embodiment of a method for controlling multi-protocol operation in accordance with this disclosure.

Based on the scenario and content of the beginning part of the detailed description of illustrative embodiments, providing an embodiment of a method for controlling multi-protocol operation. In this embodiment, the method is applied to a mobile terminal, the mobile terminal includes a Wi-Fi module, and the Wi-Fi module includes multiple network protocols for IOT operators that control household appliances. As illustrated in FIG. 5, the method includes the following blocks S10 to S30.

In S10, acquiring the priority of each target network protocol when detecting that a plurality of network protocols in the Wi-Fi module and the corresponding IOT operator server are matching successfully, wherein the network protocol that successfully matching is taken as the target network protocol.

A Wi-Fi module of a mobile terminal is generally installed with multiple network protocols, so that users can connect different IOT operators to control home appliances based on different network protocols. For example, the Wi-Fi module of the mobile terminal is equipped with four network protocols from IOT operators, like JD, Ali, Suning, and Midea. Among them, the current network protocols of JD, Ali, and Suning are successfully matched with the corresponding IOT servers. And obtain the priority of the three network protocols of JD, Ali and Suning. The priority of the network protocol is obtained by analyzing the usage of the network protocol by the mobile terminal user according to the multi-protocol operation control device, wherein the usage of the network protocol includes: the using frequency of the network protocol, the proportion of using time, and the number of using times. In addition, when the device for controlling multi-protocol operation sets the network protocol priority value for the mobile terminal at first time, cause the initial stage, the priority of each target network protocol can be set according to the preset backup scheme. Such as the priority of each target network protocol is equal in the initial stage.

In S20, allocating a time slice of the Wi-Fi module processor for the corresponding target network protocol according to the priority, wherein the more time slices are allocated for the higher priority.

The higher the main frequency of the Wi-Fi module processor of the mobile terminal, the more time slices the processor has. The thread in the mobile terminal ensures that the successful matching target network protocol running normally. The more time slices a thread is allocated, the faster the thread will respond. So that the mobile terminal responds faster to the network protocol corresponding to the thread that allocates more time slices. The allocating module 20 allocates a corresponding number of time slices according to the priority of each target network protocol, wherein the higher the priority, the more the number of allocated time slices. For example, the target network protocols include JD, Ali, and Suning. The priority of JD is first level and is the highest priority. The number of time slices allocated to first level is 10 n (n is a default value), and the priority of Ali is second level. The number of time slices allocated to second level is 5 n (n is the default value). Suning's priority is third, and the number of time slices allocated to third level is 2 n (n is the default value).

In S30, counting the usage of each target network protocols, and dynamically adjusting the priority of each target network protocol to adjust the number of time slices that allocated to the corresponding target network protocol, wherein the higher the priority of the target network protocol, the more time slices are allocated.

After the time slice is allocated for each target network protocol according to the priority of the current target network protocol, the usage of each target network protocol by the user is restart statistics, and then confirm the priority of each target network protocol with the latest usage of each target network protocol. So that the number of time slices is dynamically allocated for each target network protocol according to the latest priority, wherein the higher the priority of the target network protocol, the more time slices are allocated. For example, the target network protocol of JD has the highest priority previously. But the user changes the usage habits and starts to use Ali to control the household appliances currently, so that the priority of the corresponding target network protocol of Ali is greatly improved. Therefore, the time slice of the Wi-Fi module processor for processing the Ali corresponding target network protocol and the processing and response speed of the Ali network protocol are both greatly increased.

In this embodiment, acquiring the priority of each target network protocol when detecting that a plurality of network protocols in the Wi-Fi module and the corresponding IOT operator server are matching successfully. And allocating a time slice of the Wi-Fi module processor for the corresponding target network protocol according to the priority. And counting the usage of each target network protocols, and dynamically adjust the priority of each target network protocol to adjust the number of time slices that allocated to the corresponding target network protocol. Therefore, the network protocols frequently used by user is dynamically given a higher priority, and processor time slices are allocated to the target network protocol actually used by the user. So that the mobile terminal Wi-Fi module can improve the response speed to the target network protocol used by user, which can avoid wasting too much time on the target network protocol that infrequently used. Thereby improving the response speed of the mobile terminal to the network protocol and improving the user experience without increasing the cost of the Wi-Fi module.

Further, the block S30 includes the following blocks S31 to S32.

In S31, calculating a usage time proportion of each target network protocols within a preset duration.

In S32, adjusting the priority of all the target network protocols once every preset interval according to the usage time proportion, wherein the higher the usage time of the target network protocol is, the higher the corresponding priority is; and reallocating time slices for each target network protocol based on the adjusted priority.

The usage of each target network protocol can be expressed by the usage time proportion. The usage time proportion refers to the ratio of the duration of user's continuous use of a target network protocol to a preset duration. The user controls the home appliance N times based on the target network protocol within T minutes, then T minutes is the duration of user's continuous use of a target network protocol. For example, the target network protocols are JD, Ali, and Suning. It can be defined that if the home appliance is controlled twice based on a target network protocol within 10 minutes, then the target network protocol usage time is increased by 10 minutes. And the preset duration is 24 hours a day. Therefore, it can be counted that JD's target network protocol usage time is 60 minutes, Ali's target network protocol usage time is 10 minutes, and Suning's target network protocol usage time is 0 minutes, so that the user mainly uses JD, accidentally or by mistake using Ali, do not use Suning. Therefore, JD's usage time proportion is the highest, Ali is second, Suning finally, thus increasing JD's priority, correspondingly lowering the priority of Ali and Suning, and reallocating time slices for each target network protocol according to the adjusted priority.

Optionally, the priority includes a first level priority, a second level priority, and a third level priority. The block of reallocating time slices for each target network protocol based on the adjusted priority of S31 comprises:

Allocating a corresponding proportion time slices for each target network protocol based on the adjusted priority; if the target network protocol is the first level priority, then allocate the first proportion time slices of the Wi-Fi module processor to the target network protocol; if the target network protocol is the second level priority, then allocate the second proportion time slices of the Wi-Fi module processor to the target network protocol; if the target network protocol is the third level priority, then allocate the third proportion time slices of the Wi-Fi module processor to the target network protocol; wherein the first proportion is greater than the second proportion, and the second proportion is greater than the third proportion.

The first level priority is the highest priority of the target network protocol, allowing one target network protocol to be set as the first level priority. The second level priority is the second priority of the target network protocol, allowing two target network protocols to be set as the second level priority Level. The third level priority is the third priority of the target network protocol, allowing other target network protocols to be set as the third level priority. For example, the first-level priority target network protocol has a time slice occupancy rate of 80% for the Wi-Fi module processor, and the second-priority target network protocol has a time slice occupancy rate of 20% for the Wi-Fi module processor. The third-level priority target network protocol has a time slice occupancy of zero for the Wi-Fi module processor. The priority of the target network protocol can be switched between the first, second, and third priorities. For example, obtaining the priority of the target network protocol according to the historical usage time proportion of each target network protocol. For example, JD is first-level priority, Midea and Ali are the second-level priority, Suning is the third-level priority. If the preset duration is 24 hours per day, the basic daily protocol for controlling electrical household appliances is JD. When detecting that the user continuously operate the target network protocol corresponding to Midea for preset times (for example, 5 times) in a preset duration (for example, 60 minutes). Then adjusting the Midea corresponding target network protocol to the first-level priority temporarily, and adjusting JD to second level priority. Therefore, the priority of each target network protocol is dynamically adjusted, and then the time slice allocated to each target network protocol is adjusted, thereby allocating most of the time slices of the Wi-Fi module processor to the target network protocol frequently used by the user, thereby greatly improving the user. Responsiveness of frequently used target network protocols improves user experience.

In another embodiment of the method for controlling multi-protocol operation, the method further comprises the following blocks S40 to S50.

In S40, when the matching request is detected, determining a network protocol to be matched and other network protocols except the network protocol to be matched from all the network protocols of the Wi-Fi module.

In S50, releasing a preset ratio of time slices assigned to other network protocols, allocating the released time slices and the remaining time slices of the Wi-Fi module processor to the network protocol to be matched, for the network protocol to match with the corresponding IOT operator server.

When network of a mobile terminal is starting or just started, the network protocols of the Wi-Fi module in the mobile terminal start to match. The network protocol to be allocated initiates a matching request. When detecting the matching request, determining a network protocol to be matched and other network protocols except the network protocol to be matched from all the network protocols of the Wi-Fi module. The other network protocols refer to network protocols that do not need to be matched at present, such as network protocols that have been successfully matched, or network protocols do not need to used, etc. Then, releasing a preset ratio of time slices assigned to other network protocols. Preferably, all time slices occupied by other network protocols are released here, that is, the corresponding threads of other network protocols are suspended, stopping operation of other network protocols. Allocating the released time slices and the remaining time slices of the Wi-Fi module processor to the network protocol to be matched. Therefore, all or most of the time slices of the Wi-Fi module processor are used to match network for the network protocol to be matched, which greatly improves the network matching efficiency of the network protocol to be matched, and avoids the user waiting too long time or the failure of network matching caused by allocating the time slices to too many network protocols.

Optionally, subsequent to the block of S50, the method further comprising S60.

In S60, after the network protocol to be matched is successfully matched, reallocating the released time slices to the other network protocols for normal operation.

After the network protocol to be matched is successfully matched, returning the time slices released by other network protocols back in time. In other words, reallocating the released time slices to the other network protocols, for other network protocols to function properly. Therefore, while ensuring efficient and fast network matching of the network protocols to matched, the impact on the normal operation of other network protocols is also reduced as much as possible.

By the above description of embodiments, it will be evident to those of skill art that the methods according to the above embodiments can be implemented by means of software plus the necessary general-purpose hardware platform; they can of course be implemented by hardware, but in many cases the former will be more advantageous. Based on such an understanding, the essential technical solution of the disclosure, or the portion that contributes to the prior art may be embodied as software products. Computer software products can be stored in a storage medium (e.g., a ROM/RAM, a magnetic disk, an optical disk) and may include multiple instructions that, when executed, can cause a computing device (e.g., a mobile phone, a computer, a server, a network device, etc.), to execute the methods as described in the various embodiments of the disclosure.

The foregoing description merely portrays some illustrative embodiments according to the disclosure and therefore is not intended to limit the patentable scope of the disclosure. Any equivalent structural or flow transformations that are made taking advantage of the specification and accompanying drawings of the disclosure and any direct or indirect applications thereof in other related technical fields shall all fall in the scope of protection of the disclosure.

What is claimed is:

1. A device for controlling multi-protocol operation, wherein the device is applied to a mobile terminal, the mobile terminal comprising:
   a Wi-Fi module, the Wi-Fi module comprising a plurality of network protocols of Internet of things (IOT) operators for controlling household appliances, and
   a memory, wherein a multi-protocol operation controlling program is stored in the memory, and, wherein the device further comprises a processor configured to execute the multi-protocol operation controlling program stored in the memory to cause the device to:
   acquire priority of each target network protocol when detecting that the plurality of network protocols in the Wi-Fi module and corresponding IOT operator server are matching successfully, wherein the network protocol that successfully matching is taken as the target network protocol;
   allocate a time slice of Wi-Fi module processor for the corresponding target network protocol according to the priority, wherein the higher the priority, the more time slices are allocated; and
   count usage of each target network protocol, and dynamically adjust the priority of each target network protocol to adjust the number of time slices that allocated to the corresponding target network protocol, wherein the higher the priority of the target network protocol, the more time slices are allocated.

2. The device of claim 1, wherein the processor is further configured to execute the multi-protocol operation controlling program stored in the memory to cause the device to:
   when a matching request is detected, determine a network protocol to be matched and other network protocols except the network protocol to be matched from all the network protocols of the Wi-Fi module; and
   release a preset ratio of time slices assigned to the other network protocols, allocate the released time slices and the remaining time slices of the Wi-Fi module processor to the network protocol to be matched, for the network protocol to be matched to match with the corresponding IOT operator server.

3. The device of claim 2, wherein the processor is further configured to execute the multi-protocol operation controlling program stored in the memory to cause the device to:
   after the network protocol to be matched is successfully matched, reallocate the released time slices to the other network protocols for normal operation.

4. The device of claim 3, wherein the processor is further configured to execute the multi-protocol operation controlling program stored in the memory to cause the device to:
   calculate a usage time proportion of each target network protocols within a preset duration; and
   adjust the priority of all the target network protocols once every preset interval according to the usage time proportion, wherein the higher the usage time proportion of the target network protocol is, the higher the priority is; and
   reallocate time slices for each target network protocol based on the adjusted priority.

5. The device of claim 3, wherein the priority comprises a first level priority, a second level priority, and a third level priority; and
   the processor is further configured to execute the multi-protocol operation controlling program stored in the memory to cause the device to:
   allocate a corresponding proportion time slices for each target network protocol based on the adjusted priority, if the target network protocol is the first level priority, then allocate a first proportion time slices of the Wi-Fi module processor to the target network protocol; if the target network protocol is the second level priority, then allocate a second proportion time slices of the Wi-Fi module processor to the target network protocol; if the target network protocol is the third level priority, then allocate a third proportion time slices of the Wi-Fi module processor to the target network protocol; wherein the first proportion is greater than the second proportion, and the second proportion is greater than the third proportion.

6. The device of claim 1, wherein the processor is further configured to execute the multi-protocol operation controlling program stored in the memory to cause the device to:
   acquire the priority of the target network protocol by analyzing the usage of each target network protocol, the usage includes at least one of using frequency, proportion of using time and number of using times of the target network protocol.

7. The device of claim 1, wherein initial priority of each network protocol is a preset value.

8. The device of claim 1, wherein the processor is further configured to execute the multi-protocol operation controlling program stored in the memory to cause the device to:
   calculate a usage time proportion of each target network protocols within a preset duration; and
   adjust the priority of all the target network protocols once every preset interval according to the usage time proportion, wherein the higher the usage time proportion of the target network protocol is, the higher the priority is; and reallocate time slices for each target network protocol based on the adjusted priority.

9. The device of claim 1, wherein the priority comprises a first level priority, a second level priority, and a third level priority; and
   the processor is further configured to execute the multi-protocol operation controlling program stored in the memory to cause the device to:
   allocate a corresponding proportion time slices for each target network protocol based on the adjusted priority, if the target network protocol is the first level priority, then allocate a first proportion time slices of the Wi-Fi module processor to the target network protocol; if the target network protocol is the second level priority, then allocate a second proportion time slices of the Wi-Fi module processor to the target network protocol; if the target network protocol is the third level priority, then allocate a third proportion time slices of the Wi-Fi module processor to the target network protocol; wherein the first proportion is greater than the second proportion, and the second proportion is greater than the third proportion.

10. A method for controlling multi-protocol operation, wherein the method is applied to a mobile terminal, the mobile terminal comprises a Wi-Fi module, and the Wi-Fi module comprises a plurality of network protocols for Internet of things (IOT) operators that control household appliances, the method comprises:
    acquiring priority of each target network protocol when detecting that the plurality of network protocols in the Wi-Fi module and corresponding IOT operator server are matching successfully, wherein the network protocol that successfully matching is taken as the target network protocol; and
    allocating a time slice of the Wi-Fi module processor for the corresponding target network protocol according to the priority, wherein the higher the priority, the more time slices are allocated; and counting usage of each target network protocols, and dynamically adjusting the priority of each target network protocol to adjust the number of time slices that allocated to the corresponding target network protocol, wherein the higher the priority of the target network protocol, the more time slices are allocated.

11. The method of claim 10, wherein the method further comprises:

when a matching request is detected, determining a network protocol to be matched and other network protocols except the network protocol to be matched from all the network protocols of the Wi-Fi module; and releasing a preset ratio of time slices assigned to the other network protocols, allocate the released time slices and the remaining time slices of the Wi-Fi module processor to the network protocol to be matched, for the network protocol to be matched to match with the corresponding IOT operator server.

12. The method of claim 11, wherein the block of counting the usage of each target network protocols, and dynamically adjust the priority of each target network protocol to adjust the number of time slices that allocated to the corresponding target network protocol comprises:

calculating a usage time proportion of each target network protocols within a preset duration; and adjusting the priority of all the target network protocols once every preset interval according to the usage time proportion, wherein the higher the usage time proportion of the target network protocol is, the higher the priority is; and reallocating time slices for each target network protocol based on the adjusted priority.

13. The method of claim 11, wherein the priority comprises a first level priority, a second level priority, and a third level priority; the block of reallocating time slices for each target network protocol based on the adjusted priority comprises:

allocating a corresponding proportion time slices for each target network protocol based on the adjusted priority, if the target network protocol is the first level priority, then allocate a first proportion time slices of the Wi-Fi module processor to the target network protocol; if the target network protocol is the second level priority, then allocate a second proportion time slices of the Wi-Fi module processor to the target network protocol; if the target network protocol is the third level priority, then allocate a third proportion time slices of the Wi-Fi module processor to the target network protocol; wherein the first proportion is greater than the second proportion, and the second proportion is greater than the third proportion.

14. The method of claim 11, further comprising, subsequent to the block of releasing a preset ratio of time slices assigned to the other network protocols, allocate the released time slices and the remaining time slices of the Wi-Fi module processor to the network protocol to be matched:

after the network protocol to be matched is successfully matched, reallocating the released time slices to the other network protocols for normal operation.

15. The method of claim 14, wherein the block of counting the usage of each target network protocols, and dynamically adjusting the priority of each target network protocol to adjust the number of time slices that allocated to the corresponding target network protocol comprises:

calculating a usage time proportion of each target network protocols within a preset duration; and adjusting the priority of all the target network protocols once every preset interval according to the usage time proportion, wherein the higher the usage time proportion of the target network protocol is, the higher the priority is; and reallocating time slices for each target network protocol based on the adjusted priority.

16. The method of claim 14, wherein the priority comprises a first level priority, a second level priority, and a third level priority; the block of reallocating time slices for each target network protocol based on the adjusted priority comprises:

allocating a corresponding proportion time slices for each target network protocol based on the adjusted priority, if the target network protocol is the first level priority, then allocate a first proportion time slices of the Wi-Fi module processor to the target network protocol; if the target network protocol is the second level priority, then allocate a second proportion time slices of the Wi-Fi module processor to the target network protocol; if the target network protocol is the third level priority, then allocate a third proportion time slices of the Wi-Fi module processor to the target network protocol; wherein the first proportion is greater than the second proportion, and the second proportion is greater than the third proportion.

17. The method of claim 10, wherein the block of counting the usage of each target network protocols, and dynamically adjust the priority of each target network protocol to adjust the number of time slices that allocated to the corresponding target network protocol comprises:

calculating a usage time proportion of each target network protocols within a preset duration; and adjusting the priority of all the target network protocols once every preset interval according to the usage time proportion, wherein the higher the usage time proportion of the target network protocol is, the higher the priority is; and reallocating time slices for each target network protocol based on the adjusted priority.

18. The method of claim 10, wherein the priority comprises a first level priority, a second level priority, and a third level priority; the block of reallocating time slices for each target network protocol based on the adjusted priority comprises:

allocating a corresponding proportion time slices for each target network protocol based on the adjusted priority, if the target network protocol is the first level priority, then allocate a first proportion time slices of the Wi-Fi module processor to the target network protocol; if the target network protocol is the second level priority, then allocate a second proportion time slices of the Wi-Fi module processor to the target network protocol; if the target network protocol is the third level priority, then allocate a third proportion time slices of the Wi-Fi module processor to the target network protocol; wherein the first proportion is greater than the second proportion, and the second proportion is greater than the third proportion.

19. The method of claim 10, wherein the method further comprises:

acquiring the priority of the target network protocol by analyzing the usage of each target network protocol, the usage includes at least one of using frequency, proportion of using time and number of using times of the target network protocol.

20. The method of claim 10, wherein initial priority of each network protocol is a preset value.

* * * * *